United States Patent
Lamberton et al.

(10) Patent No.: US 6,779,017 B1
(45) Date of Patent: Aug. 17, 2004

(54) METHOD AND SYSTEM FOR DISPATCHING CLIENT SESSIONS WITHIN A CLUSTER OF SERVERS CONNECTED TO THE WORLD WIDE WEB

(75) Inventors: Marc Lamberton, Antibes (FR); Eric Levy-Abegnoli, Nice (FR); Eric Montagnon, Gattieres (FR); Pascal Thubert, Vence (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/473,613

(22) Filed: Dec. 29, 1999

(30) Foreign Application Priority Data

Apr. 29, 1999 (EP) .................................. 99480027

(51) Int. Cl.7 .............................................. G06F 15/16
(52) U.S. Cl. .................... 709/203; 709/238; 718/105
(58) Field of Search .............................. 709/105, 203, 709/217, 238; 718/105

(56) References Cited

U.S. PATENT DOCUMENTS

| | | | | |
|---|---|---|---|---|
| 5,774,660 A | * | 6/1998 | Brendel et al. | 709/100 |
| 5,805,820 A | * | 9/1998 | Bellovin et al. | 707/10 |
| 5,867,706 A | | 2/1999 | Martin et al. | 395/675 |
| 6,167,427 A | * | 12/2000 | Rabinovich et al. | 709/201 |
| 6,185,598 B1 | * | 2/2001 | Farber et al. | 709/200 |
| 6,185,619 B1 | * | 2/2001 | Joffe et al. | 709/223 |
| 6,195,680 B1 | * | 2/2001 | Goldszmidt et al. | 709/203 |
| 6,249,801 B1 | * | 6/2001 | Zisapel et al. | 709/105 |
| 6,345,303 B1 | * | 2/2002 | Knauerhase et al. | 707/10 |
| 6,389,462 B1 | * | 5/2002 | Cohen et al. | 707/10 |
| 6,415,335 B1 | * | 7/2002 | Lowery et al. | 710/5 |
| 6,424,992 B2 | * | 7/2002 | Devarakonda et al. | 370/237 |

OTHER PUBLICATIONS

"A Scalable and Highly Available Web Server", By Daniel M. Dias, W. Kish, R. Mukherjee and R. Tevari, IBM Research Division, Yorktown Heights, New York, 1063–6390/96, 1996 IEEE.

IBM Technical Disclosure Bulletin, Method for Dynamically Routing Web Requests to Different Web Servers, vol. 40, No. 12, Dec., 1997.

"Scalable Web Server Architectures", 0–8186–7852–6/97, 1997 IEEE.

"SWEB: Towards a Scalable World Wide Web Server on Multicomputers", By, D. Andresen, T. Yang, V. Holmedahl, O. Ibarra, Dept. of Computer Science, University of California, 1063–7133/96, 1996 IEEE.

"Load Balancing Internet Servers", IBM, SG24–4993–00, Dec., 1997.

* cited by examiner

*Primary Examiner*—Mehmet B. Geckil
(74) *Attorney, Agent, or Firm*—Duke W. Yee; A. Bruce Clay; Stephen J. Walder, Jr.

(57) ABSTRACT

Load balancing of client transactions, for the duration of a client session, in a Web site is implemented by a cluster of servers. An initial request in each client session is sent to the site load balancer, thus, greatly enhancing the capability of the site to accept new session requests. All subsequent requests from a client are forwarded directly to the server first selected so that the sessions cannot be later broken by the load balancer.

12 Claims, 5 Drawing Sheets

METHOD AND SYSTEM FOR DISPATCHING CLIENT SESSIONS WITHIN A CLUSTER OF SERVERS CONNECTED TO THE WORLD WIDE WEB

FIELD OF THE INVENTION

The present invention deals with the global Internet network and more particularly to those of the Internet Servers of World Wide Web (WWW)sites organized as a cluster or group of servers forming a single entity.

BACKGROUND OF THE INVENTION

The Internet is the world's largest network, and it has become essential in organizations such as government, academia and commercial enterprises. Transactions over the Internet are becoming more common, especially in the commercial arena. The information that organizations have on their traditional or legacy business applications may now be published and made accessible to a wide audience. This access may include a person checking a bank savings account, making a hotel reservation or buying tickets for a concert. Making this information or service available for their customers is a competitive advantage for any organization. However, regardless of the innovation and potential benefits provided by a company's Internet solution, its value is greatly reduced if the information cannot be accessed in a reasonable response time. The load on an Internet site is unlikely to remain constant. The number of accesses on a Web server can increase for several reasons.

1. Most companies add their Web site's address to television, radio and print advertising and to product catalogues and brochures. Therefore, awareness of the Web site grows.
2. As time passes, the Web site gains better coverage in the on-line search engines.
3. Assuming the site is providing useful information or a useful service to customers, repeat visitors should increase.
4. Most Web sites begin simply, with fairly modest content, mostly text, with some images. As the site designers grow in confidence, more resources are allocated, and as Web users in general increase their modem speeds, most sites move towards richer content. Thus, not only do hit rates increase, but the average data transfer per hit also rises.
5. Most sites begin as presence sites providing corporate visibility on the Internet and making information about the company available to potential customers. Most present sites use predominantly static Hyper Text Marked-up Language or HTML pages. Static pages are generated in advance and stored on disk. The server simply reads the page from the disk and sends it to the browser. However, many companies are now moving towards integration applications that allow users of the Web site to directly access information from the company's existing applications. This could include checking the availability of products, querying bank account balances or searching problem databases. These applications require actual processing on the server system to dynamically generate the Web page. This dramatically increases the processing power required in the server.

There are several ways to deal with the growth of an Internet site, like purchasing an initial system that is much too large. This is one way to deal with Web site growth; however, most companies are not willing to invest large sums of money in a system that is much larger than they require, particularly since the benefits that they will gain from the site have yet to be proven. Most prefer to purchase a minimal initial system and upgrade as the site demonstrates its worth to the company. In this realm of solutions, load balancing between multiple servers is very often used. In this case, the load for the overall site is balanced between multiple servers. This allows scaling beyond the maximum performance available from a single system and allows for easy upgrading by simply installing additional servers and reconfiguring the cluster to use the additional servers. This solution can also provide the added benefit of higher server availability. The load-balancing software can automatically allow for the failure of a single server and balance the load between the remaining sites. Because the Internet model allows the distribution of services among different servers, called Internet Servers, it is definitively feasible not to tie an application to one specific server. Instead, the service belongs to a group of servers; so an additional computer can be added or removed when necessary. However, grouping the set of servers in a single entity implies that load balancing is efficiently performed between these servers so as to actually achieve optimum performance. A discussion on this and more on load balancing can be found, for example, in a paper by Dias et al., "A Scalable and Highly Available Web Server", Digest of Papers, Compcon 1996, Technologies for the Information Superhighway, Forty-first IEEE Computer Society International Conference (Cat. No. 96CB35911), pp. 85–92, February 1996.

Load-balancing products have made their way to the market. IBM's eNetwork Dispatcher (eND) is one of those products now commercially available. It creates the illusion of having just one server by grouping systems together into a cluster that behaves as a single, virtual server. The service provided is no longer tied to a specific server system; so it is possible to add or remove systems from the cluster, or shutdown systems for maintenance, while maintaining continuous service for the clients. The balanced traffic among servers seems for the end users to be a single, virtual server. The site thus appears as a single IP (Internet Protocol) address to the world. All requests are sent to the IP address of the e Network Dispatcher machine, which decides with each client request which server is the best one to accept requests, according to certain dynamically set weights. Network Dispatcher routes the clients' request to the selected server, and then the server responds directly to the client without any further involvement of eND. This makes it possible to have a small bandwidth network for incoming traffic (like Ethernet or token ring) and a large bandwidth network for outgoing traffic (like ATM—Asynchronous Transfer Mode or FDDI—Fiber Distributed Data Interface or Fast Ethernet). It can also detect a failed server and route traffic around it. General information on the way of performing load balancing between multiple servers and an eND product can be found in a 'Redbook' by IBM published by the Austin, Tex. center of the International Technical Support Organization (ITSO) and entitled "Load-Balancing Internet Servers" under the reference SG24-4993 on December 1997.

Those products are great for what they have been designed for, i.e., load-balancing, and indeed allow building of a scalable Web site capable of coping with a rapidly growing demand for higher traffic. However, they have also created their own difficulties. Because there are now numerous sophisticated Web servers that allow handling dynamic Web pages, they need to be session-aware for every user accessing their service. Several techniques indeed exist to keep track of the context in which a particular user is accessing a Web server. They are of two kinds:

the contextual data is circulating, back and forth, in the IP packets exchanged between the client and the servers. For example, it can be part of the Web pages themselves.

or the contextual data is kept in the Web server active memory or on disk. This second solution is necessary whenever the amount of data needed to define each session context is too large to be practically transported over the network with each transaction between the client and the servers.

Then, load-balancing products such as eND manage not to randomly dispatch the traffic to the servers of their cluster. They keep track of the user requests which must end up in the same server while a session is active. To achieve this, the usual technique, well known in the art, comprises utilizing the IP address of the client. Then, each transaction coming from the same IP address is dispatched to the same server.

However, this does not fit in the now frequent situations in which the end user and the server are on either side of a proxy, socks or fire-wall. All those devices, part of the Internet, are intended to deal with specific problems like, for example, the isolation of an intranet that must not be freely accessible by outsiders without any control, thus, leading to placement of a fire-wall at the intranet gateway, or a proxy, so the users within an intranet see the whole Internet through a common gateway device, somehow caching it, in an attempt to achieve better performance overall. In these situations, the client IP address is not actually known by the network dispatcher which establishes a TCP connection (the Transport Control Protocol of the Internet protocol suite) with the proxy, the socks or the fire-wall, rather than directly with the end-user. Therefore, the network dispatcher is no longer session aware, that is, it has no information that would allow it to decide that a particular end-user, for example located beyond a proxy, that was engaged in a transaction, such as buying a product from a virtual shop, an application that was first selected by the dispatcher on a particular server in the cluster of servers, has not yet completed. Then, further requests from the end-user, sometimes occurring after a long pause, could be dispatched differently by the network dispatcher just because it does its job of balancing the traffic towards a less busy server within the cluster with the obvious consequence that the new server is not aware of the transaction in progress.

There is another undesirable effect of having the end-users beyond a proxy for a load balancer. All the individual users within a group, for example, an intranet, then appear to the load balancer as a single user because their IP address is the same since it is the one of the proxy or fire-wall. Therefore, the load balancer which tends to maintain the dispatching of a given user towards the same server, in an attempt to not break sessions, at least while an inactivity timer has not elapsed, keep sending the traffic of the whole intranet to the same server. This seriously goes against what this kind of product is trying to achieve, i.e., load balancing. Although the individual users within a group would certainly enjoy not being served by the sometimes same busy server, because they are seen as being a single client by the load balancer, it is no longer possible to discriminate the individual users.

SUMMARY OF THE INVENTION

Thus, it is a broad objective of the invention to overcome the shortcomings, as noted above, of the prior art, and, therefore, enable a particular server, within a cluster of servers, to continue serving a given end-user while the current session is active and being able to discriminate the individual users within a group (intranet) so as to maintain a good load balancing over the cluster of servers.

For a more complete understanding of the present invention and for further advantages thereof, reference is now made to the following Detailed Description taken in conjunction with the accompanying drawings, in which:

It is a further object of the invention to improve the efficiency of the load balancer by requiring only one interrogation per session, thus, freeing it to dispatch even more transactions over the cluster of servers.

Further advantages of the present invention will become apparent to the ones skilled in the art upon examination of the drawings and detailed description. It is intended that any additional advantages be incorporated herein.

A method and system for preserving load balancing of client transactions, for the whole duration of the client sessions, in a Web site comprising a plurality of servers and including a load balancer accessed from a plurality of clients is described. Upon receiving a client initial request, the load balancer selects a particular server among the plurality of servers. Then, the initial request is forwarded to the selected server which issues, towards the client, a response uniquely referencing the selected server. Hence, all subsequent requests from the client are forwarded directly to the uniquely referenced server.

The method of the invention allows sending only the initial request of a client session to the load balancer of a Web site organized as a cluster of servers, thus, greatly enhancing the capability of the site to accept new session requests.

Moreover, the client sessions being effected directly between the client and the server which was initially selected, cannot be later broken by the load balancer.

Finally, the scheme works regardless of the fact that the client is beyond a proxy or a firewall, contrary to the previous art, that could only rely on the IP address of the client request to perform load balancing and to decide if a session has ended or not, leading to imperfect results both in terms of load balancing and broken sessions, especially when the actual IP address of the end user is masked by one of the above mentioned devices.

DETAILED DESCRIPTION OF THE PREFERRED EMBODIMENT

Figure 1:
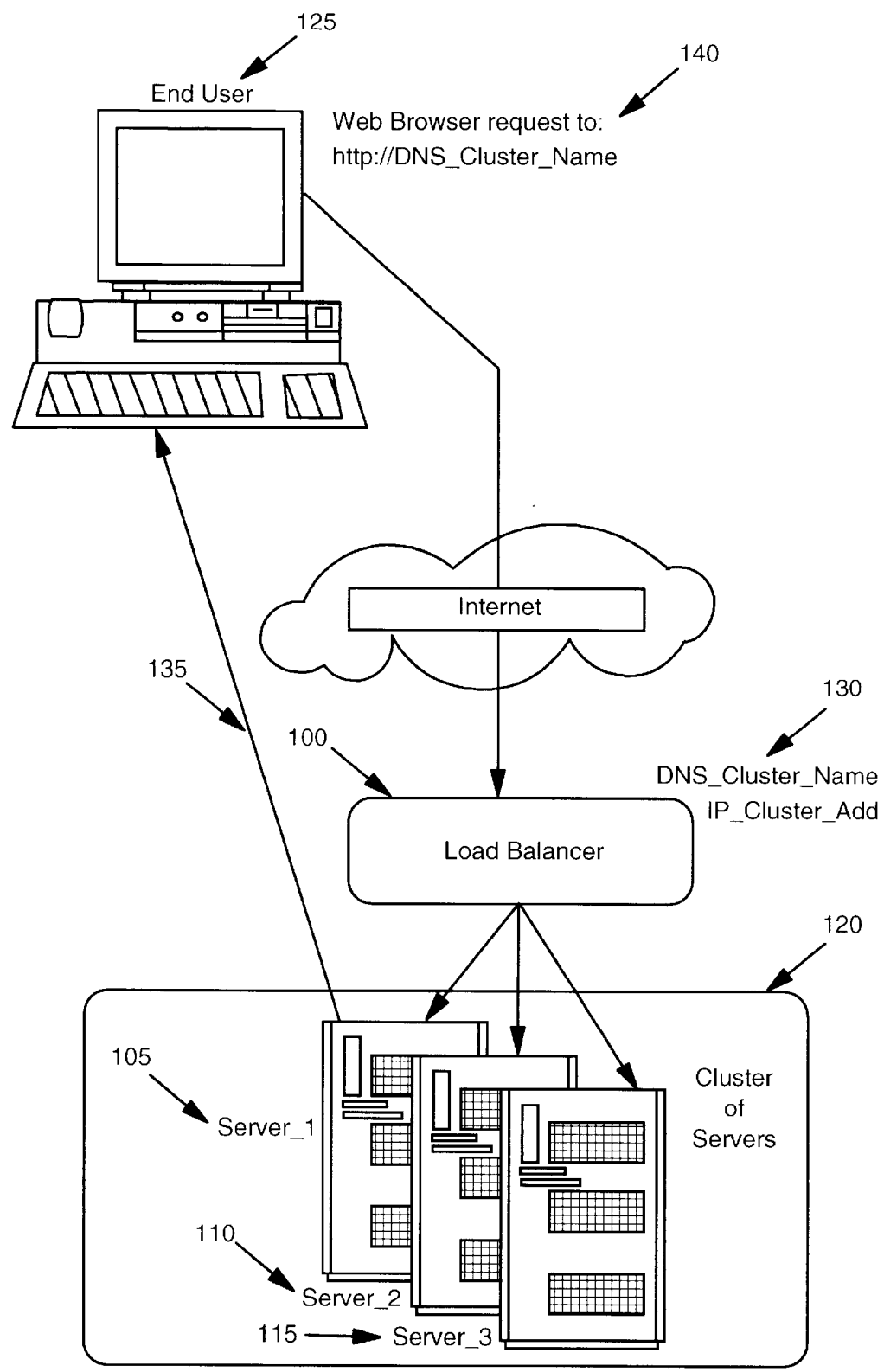
FIG. 1 describes the prior art where a load balancer dispatches end-user requests over a cluster of servers.

FIG. 1 illustrates the prior art where a load balancer [100] manages to group several servers [105], [110] and [115] together into a cluster [120] that behaves as a single, virtual server so that the service provided is no longer tied to a specific server system. The balanced traffic among servers seems for the end users, like [125], to be a single, virtual server. The site thus appears as a single DNS (Domain Name System) name and IP address [130] to the world. All requests, such as [140], issued from a Web browser, are sent to the IP address of the Load Balancer machine [100], which decides which server is best to accept requests, according to their respective workloads. Hence, load balancer [100] routes the clients' request to the selected server and the server responds directly [135] to the client without any further involvement of the load balancer. In practice, the load balancer receives the IP packets destined to the cluster. These packets have a source and a destination address. The destination address is the IP address [130] of the cluster. All servers in the cluster, i.e. [105], [110] and [115], have their own IP address and know the IP address of the cluster. The dispatcher system checks which server is less busy and routes the packet to that server. The server receives the packet and is able to respond directly to the client based on the source address contained in the packets received by the load balancer. However, with this scheme, all browser requests always end up in the load balancer, i.e., all sessions in progress plus new sessions. If too many requests are converging to the site, the bottleneck may become the load balancer itself even though there would be enough computational resources left within the cluster of servers to handle them.

Figure 2:
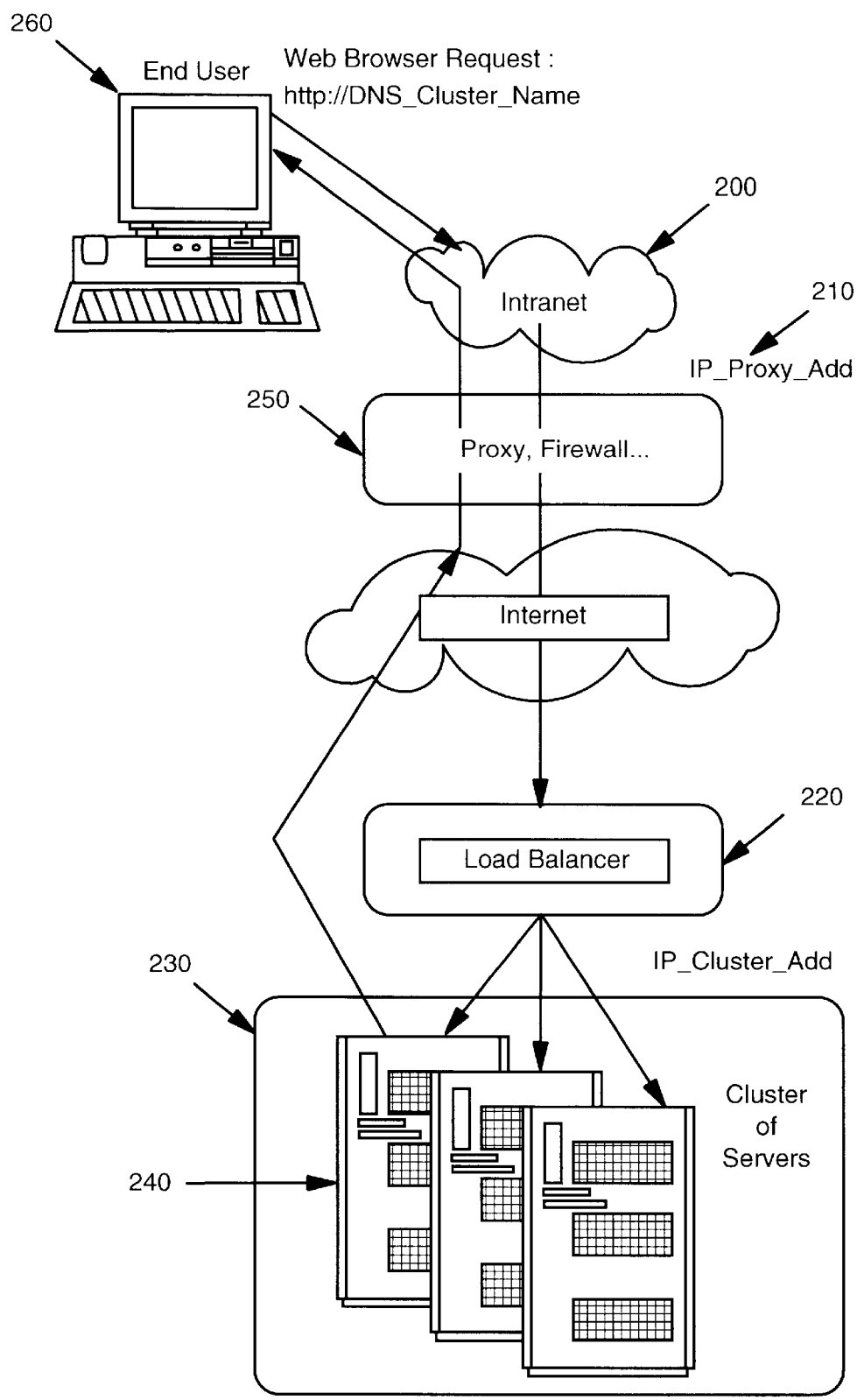
FIG. 2 depicts the common case when a Proxy or a Fire-wall is between end-users and a cluster of servers, thus, preventing a load balancer from performing a fair dispatching of the incoming requests.

FIG. 2 illustrates the now frequent case where a significant portion of a network, for example an intranet [200] shared between a group of related users, is beyond a proxy, a fire-wall or any equivalent device that filters the packets so that the IP addresses [210] of the individual users within the intranet appear to be the same for those that are outside. Then, the load balancer [220] task becomes more difficult to carry out because it tends, after a first request has been received from one of the users on the intranet [200] to keep sending all subsequent requests toward the same server within the cluster [230], for example server [240], even though the request is actually coming from a different user on this intranet. Because the proxy [250] has filtered the IP packets from the intranet, load balancer [220] is no longer able to discriminate between the individual users like user [260]. In fact, the intranet may be quite large with numerous individual users. If many of them are accessing the same site for the same type of service processed by the cluster of servers [230], there is a good chance that a continuous flow of requests arrives at the load balancer. Then, the load balancer is bound to deliver the requests to the initially selected server even if other servers of the cluster, not as busy, could deliver the same service. The above case is not unlikely just because the intranet is shared, e.g., by the personnel of a specific company, say, a financial institution. All members may have some interest in consulting the same type of information during the day, say, stock exchange rates. Therefore, this situation may tend to prevent the load balancer from spreading an equal share of the workload over all servers of a cluster of servers.

A second type of problem is encountered if, contrary to the above described situation, no request is arriving for some time at the load balancer so that a significant period of inactivity lets the load balancer think that the user session has ended. Then, it may decide to reassess load balancing with the arrival of another request even though the session is still in progress from the viewpoint of the end-user. This may happen when a particular end-user is pausing for a long time while the other users on the intranet are not accessing the cluster of servers [230]. Therefore, a further request from the end-user [260] may end up in a different server of the cluster, i.e., not in server [240]. The newly selected server is not aware of the transaction in progress and the context is lost. Hence, a transaction that is in progress, e.g., the payment of an item bought from a virtual shop, is aborted.

Figure 3:
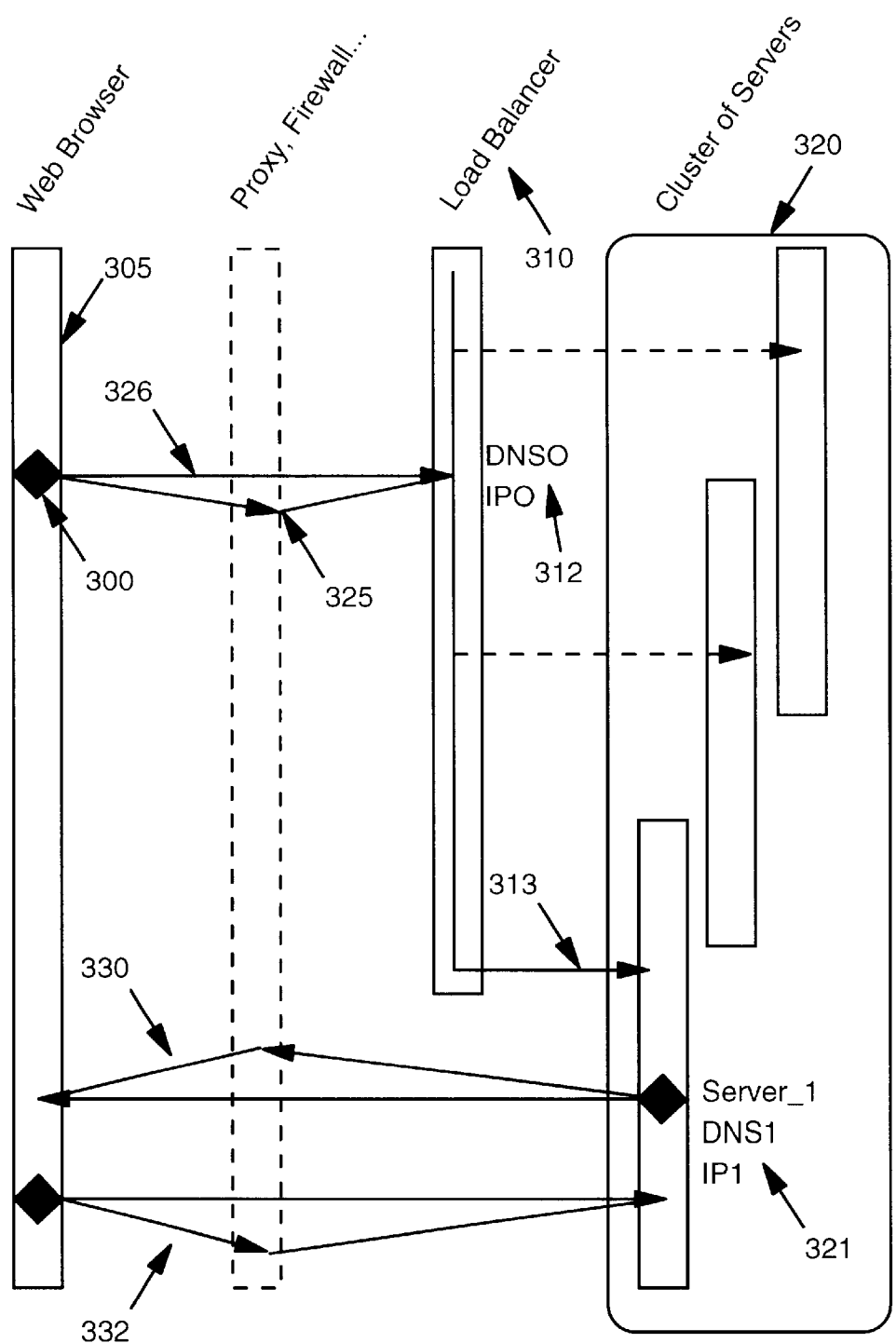
FIG. 3 describes the general solution brought by the invention to the shortcomings of the previous art.

FIG. 3 depicts the general solution to the problems induced by the use of a load balancer dispatching incoming Web browser requests over a cluster of servers as discussed above. Whenever a new request [300] from a Web browser [305] is issued, it is forwarded to a load balancer [310] because it has a load balancer DNS name and corresponding IP address (referred to as DNS0 and IP0 [312] in the particular example of FIG. 3) which is made public for the service or the set of services advertised for the Web site implemented in the form of a cluster of servers [320]. Contrary to the prior art, it makes no difference to the present invention whether the request is either received directly [326] or through a proxy [325]. Whenever the initial request reaches the load balancer [310], it is dispatched to one of the servers in the cluster of servers [320]. The decision of routing towards one particular server, like server [313] in this example, is the prime job of the load balancer. The metric used to decide which server is to be selected at a given instant depends on the design of the load balancer which is assumed to collect from all the servers, at regular intervals, performance information regarding their level of activity. In broad general terms, it can be said that the least busy of the servers is selected in an attempt to indeed reach the goal of balancing the workload equally over all the servers. The invention does not, per se, interfere with this process which is under the sole responsibility of the load balance. However, the invention contributes dramatically to improving the performance of the load balancer by forwarding to it only initial requests, like [300], issued by the Web browser [305] when initializing a session, as will become apparent in the following. Thus, the request is forwarded, in the example of FIG. 3, to server [321] that met the criterion for being elected to process initial request [300] at the time it reached the load balancer [310] and passed on as initial request [313] on the basis of the performance data that were collected by the load balancer from the servers. At this point the rest of the session is handled solely by the particular server, e.g., [321] without any further implication of the load balancer which is then completely free to accept all new requests arriving at the site and generally referred to as "hits" in the literature that deals with Web site performance, at least until all the resources of the cluster of servers are completely exhausted. This is a complete departure from the prior art where the processing of new hits interfered with the processing of all the sessions already in progress as illustrated in previous figures, thus, leading to postponing the processing of a new request by the load balancer when it is too busy itself dispatching the numerous requests of the sessions already in progress, even though there may still be plenty of computing resources available, hence, wasted in the cluster of servers. Although the present invention has been described with respect to a specific preferred embodiment thereof, various changes and modifications may be suggested to one skilled in the art, and it is intended that the present invention encompass such changes and modifications as fall within the scope of the appended The above is made possible because each of the servers within the cluster of servers has its own unique DNS name at a corresponding IP address, for example, DNS1 and IP1 for the server [321]. Therefore, the server that has been elected by the load balancer, upon receiving the initial request [313] will reply directly [330] to the Web browser of the end-user. This reply mentions the Uniform Resource Locator or URL to be used for the further requests of that session. This URL contains the DNS name or the IP address of the elected server i.e.: DNS1 or IP1. All further requests [332] are forwarded directly to the selected server, thus, freeing the load balancer from dispatching the subsequent session requests as mentioned above and insuring that all reach the same server for the duration of the session. Again, the Web browser and the cluster of servers may be on either side of a proxy like [325] without impacting the above scheme, contrary to the prior art.

Figure 4:
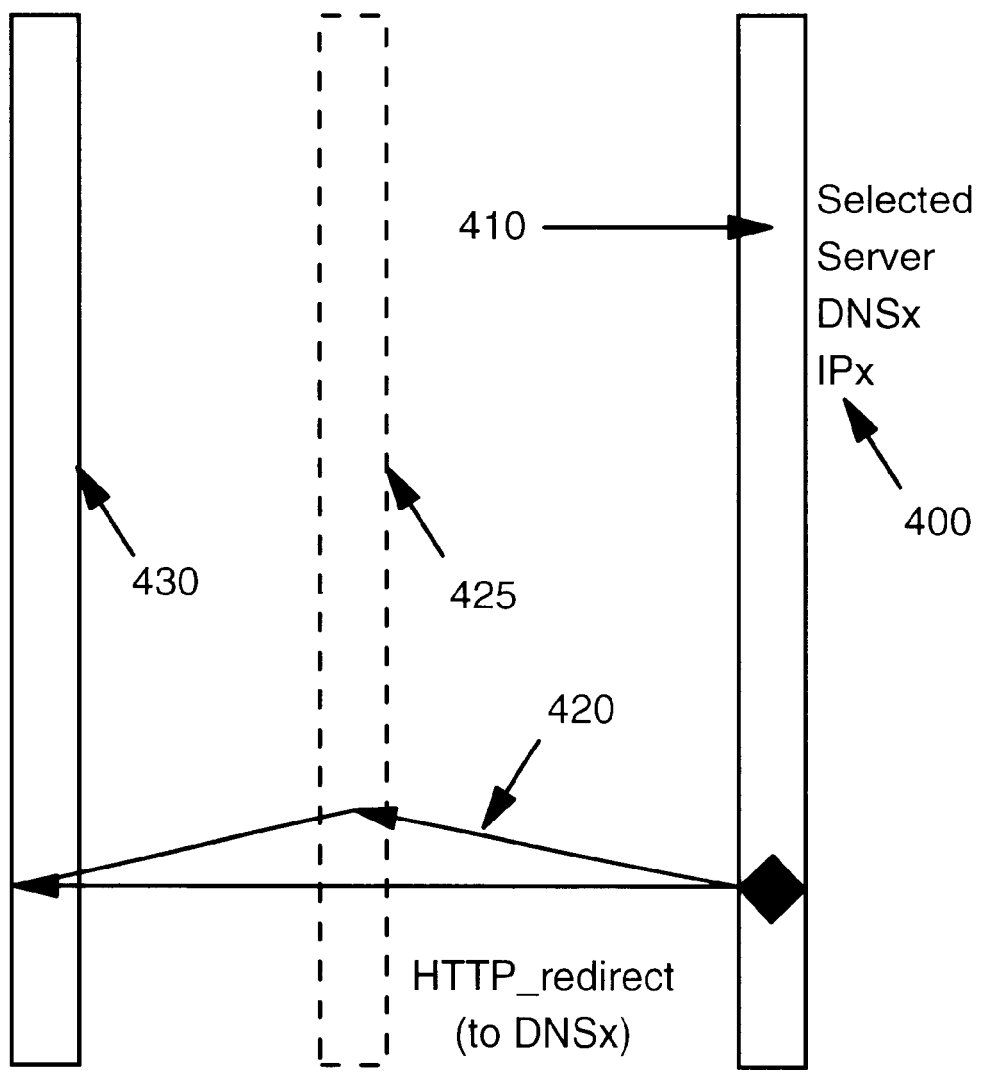
FIG. 4 describes a particular implementation of the invention insuring a fair balancing of the workload over all the servers in a cluster of servers, guaranteeing that no session is broken.

FIG. 4 illustrates one particular implementation of the general solution depicted in FIG. 3. It takes advantage of the above mentioned option that a specific response could be issued by the selected server to inform the end-user browser of the actual DNS name of the server elected to process its session. The protocol, part of the TCP/IP suite of protocols, used by the Web server to transfer hypermedia documents across the Internet, known under the acronym of HTTP for Hyper Text Transport Protocol, specifically foresees the possibility of redirecting a request that was issued for a specific DNS name to another DNS name for the duration of the session. Hence, whenever the selected server [400] receives a new request [410] it just responds with a HTTP redirect command [420], either directly or through a proxy [425], destined to the end-user browser [430] and carrying the actual DNS name of the server in charge [400] so that the rest of the session takes place, as required, directly between the remote browser and the particular server.

Figure 5:
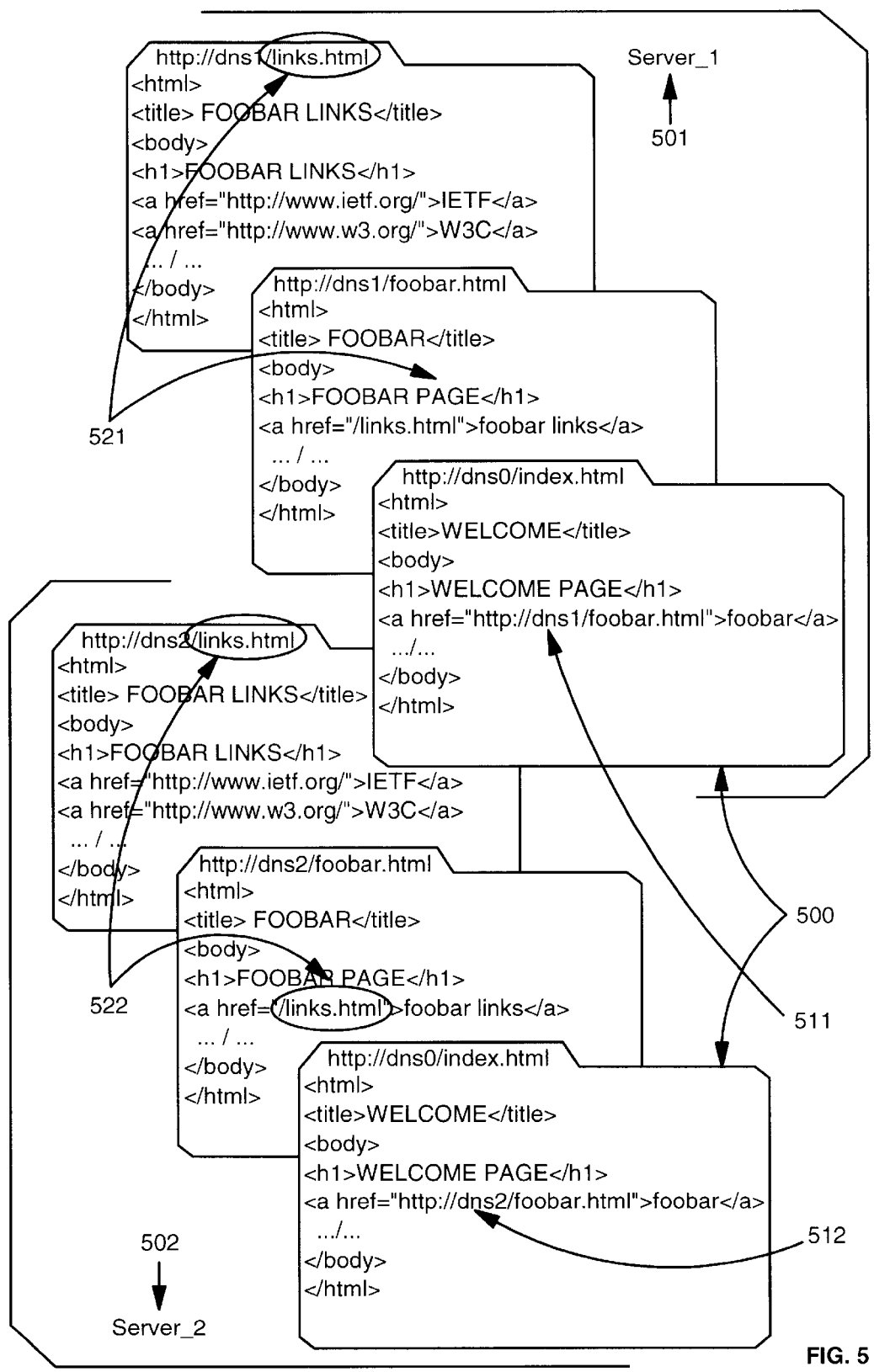
FIG. 5 describes an alternate implementation of the invention with the same advantages.

FIG. 5 is another example of how to implement the general solution of FIG. 3 to solve the shortcomings of the prior art. In this approach the "WELCOME" page [500] of every server, within the cluster of servers, supporting a given set of services, is identical except for the DNS names [511] or [512] explicitly referencing the particular DNS address of the server on which the "WELCOME" page is loaded. Although, for the sake of clarity, this particular example illustrates only two servers, i.e., Server_1 [501] and Server_2 [502], it is to be understood that any number of servers could be considered. Thus, it is load balancer responsibility to decide which server is going to process a new arriving request from a remote end-user browser by directing it either to Server_1 [501] or Server_2 [502]. Whichever server is elected, it forwards its own "WELCOME" page [500] to the end-user. Then, when the end-user decide to use "FOOBAR", a service offered at this site and displayed in the "WELCOME" page menu, a new request is sent by the browser which directly addresses Server_1 or Server_2 depending on the DNS address that was contained in the received "WELCOME" page i.e. ../dns1/.. [511] or ../dns2/.. [512]. From that point on, the other pages of the "FOOBAR" service are referenced relatively to the first page without any further reference to the specific server (using relative URL's (Uniform Resource Locators.) That is, only the link is specified as shown in [521 ] and [522]. Therefore, all further requests from the end-user browser directly reach the server that was chosen by the load balancer at the beginning of the session, fully carrying out the solution described in general terms in FIG. 3, thus, enabling all of its advantages.

What is claimed:

1. A method for preserving load balancing of client transactions for duration of a client session in a Web site comprising a plurality of servers and including a load balancer accessed from a plurality of clients, said method comprising the steps of:

receiving an initial request from a client at said load balancer, wherein the initial request is the only request received by said load balancer from said client for duration of the client session;

said load balancer selecting a particular server from among said plurality of servers;

forwarding said initial request to said particular server;

issuing from said particular server, towards said client, a response uniquely referencing said particular server; and directly forwarding all subsequent requests from said client to said uniquely referenced particular server, wherein said step of issuing a response from said particular server further comprises before said client initial request is honored, issuing a redirection command to said client including a unique reference of said particular server.

2. The method according to claim 1 wherein:

said response from said particular server self-contains a unique reference of said selected server.

3. The method according to claim 1, wherein the client session is processed by said particular server until the session is ended by said client.

4. A system for preserving load balancing of client transactions for duration of a client session in a Web site comprising a plurality of servers and including a load balancer accessed from a plurality of clients, said system comprising:

means for receiving an initial request from a client at said load balancer, wherein the initial request is the only request received by said load balancer from said client for duration of the client session; said load balancer selecting a particular server from among said plurality of servers;

means for forwarding said initial request to said particular server;

means for issuing from said particular server, towards said client, a response uniquely referencing said particular server; and means for directly forwarding all subsequent requests from said client to said uniquely referenced particular server, wherein means for issuing a response from said particular server further comprises before said client initial request is honored, means for issuing a redirection command to said client including a unique reference of said particular server.

5. A computer program product recorded on computer readable media for preserving load balancing of client transactions for duration of a client session in a Web site comprising a plurality of servers and including a load balancer accessed from a plurality of clients, said program product comprising:

computer readable means for receiving an initial request from a client at said load balancer, wherein the initial request is the only request received by said load balancer from said client for duration of the client session; said load balancer selecting a particular server from among said plurality of servers;

computer readable means for forwarding said initial request to said particular server;

computer readable means for issuing from said particular server, towards said client, a response uniquely referencing said particular server; and computer readable means for directly forwarding all subsequent requests from said client to said uniquely referenced particular server, wherein computer readable means for issuing a response from said particular server further comprises before said client initial request is honored, computer readable means for issuing a redirection command to said client including a unique reference of said particular server.

6. A method for processing requests directed towards a cluster of servers, the method comprising:
   receiving an initial request from the client at a load balancer;
   sending, by the load balancer, the request to a particular server from the plurality of servers; and
   returning a response, by the particular server, to the client, wherein the response includes information uniquely referencing the particular server, wherein subsequent requests bypass the load balancer and are sent to the particular server from the client using the information, wherein the response is a redirection command containing the information.

7. The method of claim 6, wherein the information includes at least one of an IP address and a DNS name for the particular server.

8. The data processing system of claim 6, wherein the information includes at least one of an IP address and a DNS name for the particular server.

9. The computer program product of claim 6, wherein the information includes at least one of an IP address and a DNS name for the particular server.

10. A server system comprising:
    a load balancer; and
    a plurality of servers, wherein the load balancer receives an initial request from a client and sends the request to a particular server from a plurality of servers and wherein the particular server returns a response to the client in which the response includes information uniquely referencing the particular server such that subsequent requests are sent to the particular server from the client using the information in which the subsequent requests bypass the load balancer, wherein the response is a redirection command containing the information.

11. A data processing system for processing requests directed towards a cluster of servers, the data processing system comprising:
    a bus system;
    a communications unit connected to the bus system;
    a memory connected to the bus system, wherein the memory includes a set of instructions; and
    a processing unit connected to the bus system, wherein the processing unit executes the set of instructions to receive an initial request from the client at a load balancer; send, by the load balancer the request to a particular server from the plurality of servers; and return a response, by the particular server, to the client in which the response includes information uniquely referencing the particular server in which subsequent requests bypass the load balancer and are sent to the particular server from the client using the information, wherein the response is a redirection command containing the information.

12. A computer program product in a computer readable medium for processing requests directed towards a cluster of servers, the computer program product comprising:
    first instructions for receiving an initial request from the client at a load balancer;
    second instructions for sending, by the load balancer, the request to a particular server from the plurality of server; and
    third instructions for returning a response, by the particular server, to the client, wherein the response includes information uniquely referencing the particular server, wherein subsequent requests bypass the load balancer and are sent to the particular server from the client using the information, wherein the response is a redirection command containing the information.

* * * * *